United States Patent
Rutherford

(10) Patent No.: US 10,681,899 B1
(45) Date of Patent: Jun. 16, 2020

(54) SQUEAKER ASSEMBLY FOR CHILD AND PET TOYS

(71) Applicant: GRAMERCY PRODUCTS, INC., Secaucus, NJ (US)

(72) Inventor: Ryan Rutherford, Belleville, NJ (US)

(73) Assignee: GRAMERCY PRODUCTS, INC., Secaucus, NJ (US)

( * ) Notice: Subject to any disclaimer, the term of this patent is extended or adjusted under 35 U.S.C. 154(b) by 566 days.

(21) Appl. No.: 15/183,269

(22) Filed: Jun. 15, 2016

Related U.S. Application Data

(60) Provisional application No. 62/175,569, filed on Jun. 15, 2016.

(51) Int. Cl.
*A01K 15/02* (2006.01)
*A63H 5/00* (2006.01)

(52) U.S. Cl.
CPC ............ *A01K 15/025* (2013.01); *A63H 5/00* (2013.01)

(58) Field of Classification Search
CPC .......... A01K 15/025; A63H 5/00; A63H 3/28; A01M 31/004
USPC ........................................................ 446/207
See application file for complete search history.

(56) References Cited

U.S. PATENT DOCUMENTS

| | | | |
|---|---|---|---|
| 1,187,838 A * | 6/1916 | Hughes | A63B 43/00 446/188 |
| 1,273,122 A | 7/1918 | Adams | |
| 1,515,786 A | 11/1924 | Munro | |
| 1,612,651 A | 12/1926 | Roberts | |
| 1,649,722 A * | 11/1927 | Munro | A63H 5/00 446/193 |
| 1,868,785 A | 5/1928 | Smart | |
| 2,151,456 A | 3/1939 | Wilhelm | |
| 2,559,909 A | 7/1951 | Wescott | |
| 2,598,956 A | 6/1952 | Wintriss | |
| 2,616,217 A | 11/1952 | Wild | |
| 2,730,765 A | 1/1956 | Crafton | |
| 2,745,214 A | 5/1956 | Lawson | |
| 2,763,960 A | 9/1956 | Wintriss | |
| 2,777,252 A | 1/1957 | Tancredi | |
| 2,817,116 A | 12/1957 | Miller | |
| 2,819,558 A | 1/1958 | Freimauer | |
| 2,833,085 A * | 5/1958 | Wintriss | A63H 5/00 446/184 |
| 2,928,208 A | 3/1960 | Wintriss | |
| 3,032,920 A | 5/1962 | Cohn | |

(Continued)

*Primary Examiner* — Christopher D Hutchens
(74) *Attorney, Agent, or Firm* — Thomas A. O'Rourke; Bodner & O'Rourke, LLP

(57) ABSTRACT

A squeaker assembly is configured to reduce/minimize a total number of parts that may become dislodged by aggressive play by a pet. The squeaker includes a reed, and a resonator cup with an arm coupled thereto using a living hinge. The resonator cup is formed with an elongated curved wall that terminates on a flat surface to form a periphery corresponding to the reed's periphery, which may be a race track shape. The living hinge is a thin flexible strip of material integrally formed with the arm and curved wall, for the arm to extend substantially perpendicular to an axial direction of the resonator cup, and be pivotable from an un-engaged first position to a second position where it contacts the reed, and where a catch formed on the arm may snap over and engage a tab formed on the curved wall, for the arm to releasably engage the reed.

13 Claims, 7 Drawing Sheets

(56) References Cited

U.S. PATENT DOCUMENTS

| | | | |
|---|---|---|---|
| 3,075,317 A | 1/1963 | Craft | |
| 3,212,215 A * | 10/1965 | Freimauer | A63H 5/00 446/184 |
| 3,702,038 A | 11/1972 | Hakim | |
| 4,139,093 A * | 2/1979 | Holmes | G07D 9/004 206/0.82 |
| 4,234,080 A * | 11/1980 | Gellert | B65D 1/00 206/0.82 |
| 4,380,134 A | 4/1983 | Taluba | |
| 5,269,568 A * | 12/1993 | Courturier | G09F 3/0323 285/419 |
| 5,385,373 A * | 1/1995 | Love | F16B 41/007 24/16 PB |
| 5,421,107 A | 6/1995 | Bryan | |
| 5,560,320 A | 10/1996 | Plunk | |
| 6,112,703 A | 9/2000 | Handelsman | |
| 6,484,671 B2 | 11/2002 | Herrenbruck | |
| 6,527,614 B1 * | 3/2003 | Primos | A01M 31/004 446/207 |
| 6,609,944 B1 | 8/2003 | Viola | |
| 6,935,274 B1 | 8/2005 | Rothschild | |
| 7,066,779 B2 | 6/2006 | Willinger | |
| 7,144,293 B2 | 12/2006 | Mann | |
| 7,201,117 B2 | 4/2007 | Ritchey | |
| 7,597,065 B2 | 11/2009 | Jager | |
| 7,833,079 B2 | 11/2010 | Willinger | |
| 7,950,352 B2 * | 5/2011 | Specht | A01K 15/026 119/707 |
| 8,186,309 B2 * | 5/2012 | Specht | A01K 15/026 119/707 |
| 8,235,762 B2 | 8/2012 | Rutherford | |
| 8,276,547 B2 * | 10/2012 | Markham | A01K 15/026 119/709 |
| 8,322,308 B2 | 12/2012 | Curry | |
| 8,342,132 B2 | 1/2013 | Markham | |
| 8,342,133 B2 | 1/2013 | Markham | |
| 8,468,977 B2 | 6/2013 | Markham | |
| 8,523,628 B2 | 9/2013 | Rutherford | |
| 2002/0086608 A1 * | 7/2002 | Chu | A63H 5/00 446/200 |
| 2006/0258258 A1 * | 11/2006 | Koch, III | A01M 31/004 446/208 |
| 2007/0062461 A1 | 3/2007 | Lubeck | |
| 2008/0064292 A1 * | 3/2008 | Willinger | A63H 5/00 446/397 |
| 2010/0041302 A1 * | 2/2010 | Rutherford | A01K 15/025 446/188 |
| 2011/0214617 A1 * | 9/2011 | Markham | A01K 15/025 119/707 |
| 2012/0073514 A1 | 3/2012 | Hansen | |
| 2012/0192807 A1 * | 8/2012 | Rutherford | A01K 15/025 119/707 |
| 2014/0109841 A1 | 4/2014 | Vap | |
| 2014/0123908 A1 | 5/2014 | Crotty | |
| 2016/0143251 A1 * | 5/2016 | Larson | A01K 15/026 119/709 |
| 2017/0118957 A1 * | 5/2017 | Nunn | A01K 15/025 |

* cited by examiner

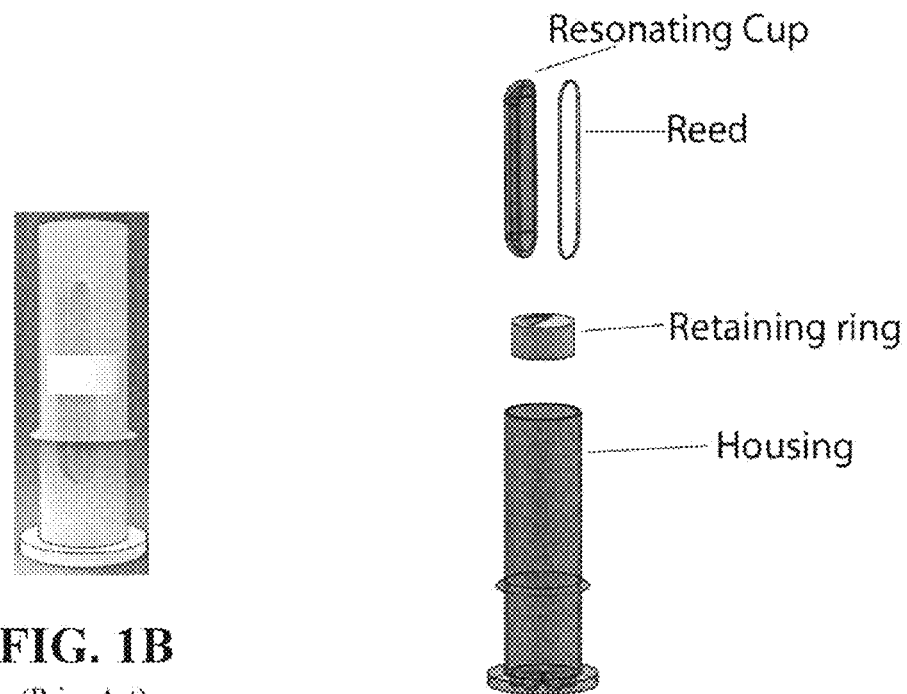
FIG. 1A
(Prior Art)
FIG. 1B
(Prior Art)
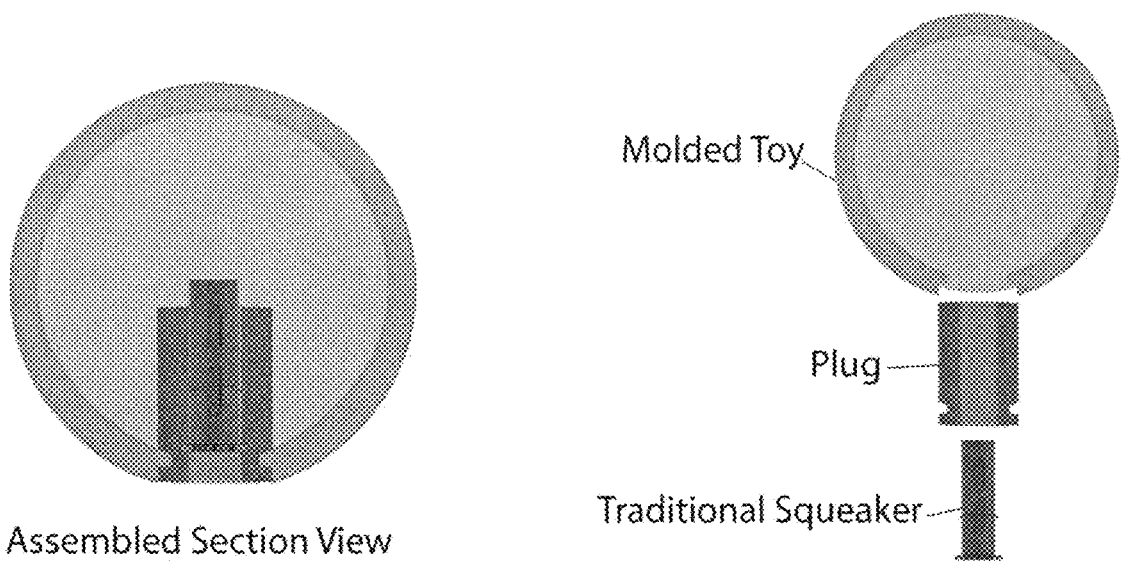
FIG. 2A
(Prior Art)
Assembled Section View
FIG. 2B
(Prior Art)

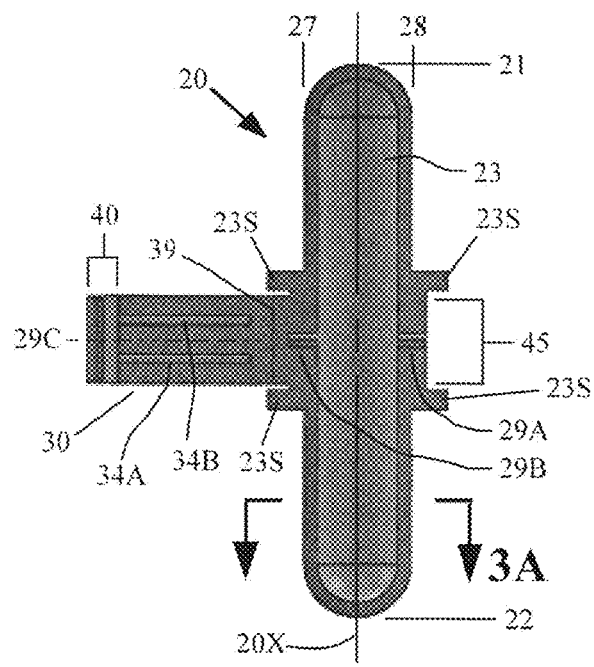
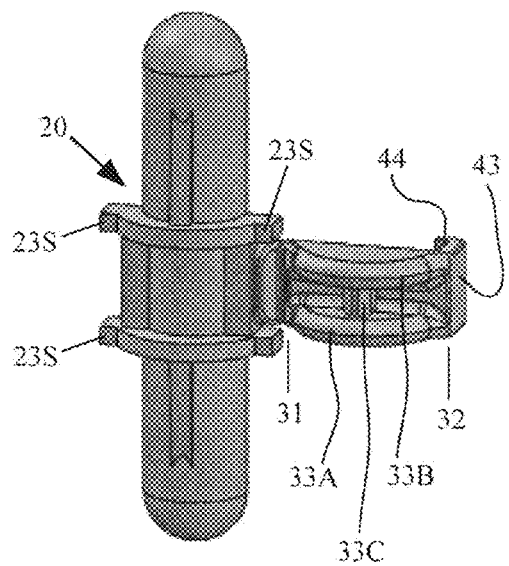
FIG. 3A
FIG. 3
FIG. 4
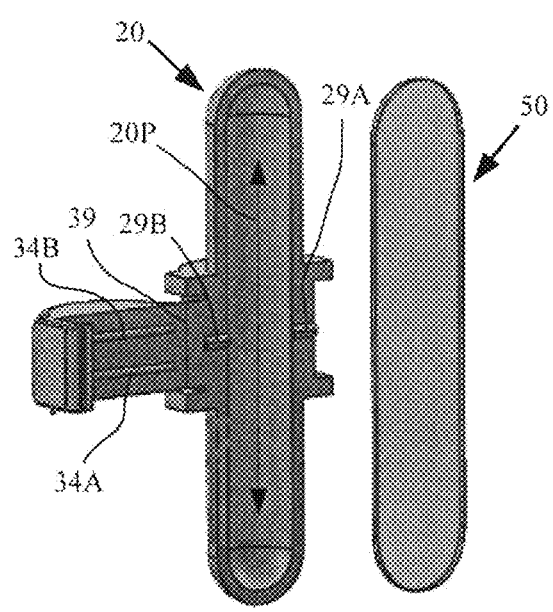
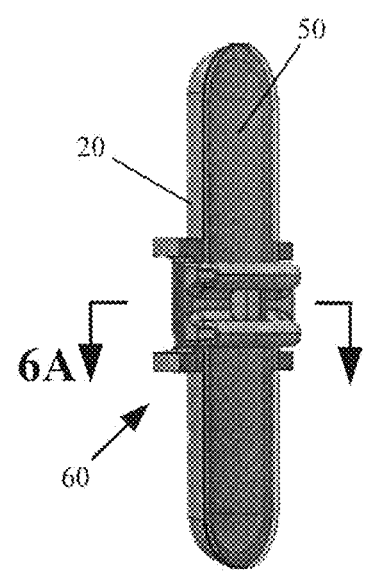
FIG. 5
FIG. 6

SQUEAKER ASSEMBLY FOR CHILD AND PET TOYS

CROSS REFERENCES TO RELATED APPLICATIONS

This application claims priority on U.S. Provisional Application Ser. No. 62/175,569 filed on Jun. 15, 2015, the disclosures of which are incorporated herein by reference.

FIELD OF THE INVENTION

The present invention relates to improvements in a noise producing assembly that generates sound as a flow of air is forced over or through it, and more particularly to a squeaker assembly that requires fewer parts to achieve a similar or even an identical sound.

BACKGROUND OF THE INVENTION

Traditionally, the squeaker assembly used in children's toys and/or pet toys includes 4 major components—a cup, a reed, a retaining ring to secure the reed to the cup, and a housing, which is usually cylindrical, and which receives the assembled reed and cup. The housing is then inserted into an opening in an elastomeric toy, and may be retained using the elasticity of the material to create a friction fit. In most applications where the material of the toy is a natural rubber or TPE compound, there may be a molded plug of the same material that is used to fill the hole left from the molding operation where the mandrel or core is removed, to allow the toy to be hollow, to create an air bladder capable of activating the squeaker (i.e., to cause air to flow over the reed and cup, to cause vibrations that create the sound). The molded plug typically includes a large column of material that doubles as both the means to retain the squeaker assembly, and as a protective device to add more durability to the squeaker.

This basic construction for a squeaker has generally remained unchanged over many decades. Such a basic device is shown, for example, by the "Voice Device" of U.S. Pat. No. 1,649,722 that was issued to Munro in 1927. The '722 patent discloses use of: "a tongue member 21" (2:6-7) which is the equivalent of the reed; that reference numeral "15 designates the body member" (1:101-102) which is the equivalent of the cup; "a disk 23" (2:13), the equivalent of the retaining ring; and "a housing member 24" (2:37). The '722 patent states that its "voice device" is "adapted more particularly to be mounted in the wall of a rubber ball." (1:70-72).

U.S. Pat. No. 8,523,628, for a "Noise Producing Toy Structure," was issued to Rutherford in 2013, and its "noise producing assembly" may similarly use "a reed" for the "squeaker 96b." with "a weight 96c placed around the squeaker," which may be received in a "shell 96a made of a durable material."

FIG. 1A herein is an exploded view that shows the component parts of a generic prior art squeaker, which are shown assembled in FIG. 1B. FIG. 2A shows the assembled prior art squeaker, a plug, and a molded toy prior to being assembled together, and FIG. 2B shows the prior art squeaker and plug after being installed through the opening in the toy.

The present invention is particularly adapted to reduce the total number of parts necessary to achieve an effective squeak producing device. In addition to being advantageous to more easily manufacture the device, the reduction in the total number of parts may also serve to minimize the parts that may be dislodged under extremely aggressive play by an animal, when used in a pet toy, thus reducing the actual and/or the perceived danger, if the parts are exposed. The reduced parts count may also reduce the total amount of non-elastomeric material included in the product, thereby reducing the overall risk to an animal.

The present invention is a modified version of a traditional squeaker design that has been reduced to only two major component parts, and eliminates both the molded plastic retaining ring and the plastic squeaker housing as individual components, and yet it achieves an identical sound to the traditional design.

OBJECTS OF THE INVENTION

It is an object of the invention to provide a squeaker that may be used in a child's toy or a pet toy.

It is another object of the invention to provide a squeaker for a toy that may be constructed using fewer parts.

It is a further object of the invention to provide a squeaker for a pet toy that may pose less of a danger to the animal if aggressive play eventually exposes the squeaker mechanism.

It is another object of the invention to provide an improved squeaker for a toy that is easier to manufacture.

It is also an object of the invention to provide an improved squeaker for a toy that reduces the total amount of non-elastomeric material included in the product.

Further objects and advantages of the invention will become apparent from the following description and claims, and from the accompanying drawings.

SUMMARY OF THE INVENTION

A squeaker assembly is configured to reduce a total number of parts to minimize the parts that may become dislodged by aggressive play by the pet. The squeaker device broadly includes a reed having a shaped periphery and a resonator cup. The resonator cup may be formed with and an elongated curved wall configured to extend along an axial direction from a first end to a second end, and having an elongated first side and an elongated second side. The elongated curved wall is configured to terminate on a flat surface, and may be formed of an inner surface and an offset outer surface, which may provide a substantially uniform thickness for the resonator cup. The inner and outer surface may be formed to provide a semi-cylindrical center wall section that may transition to first and second quarter spherical end wall sections at opposite ends, with each of the semi-cylindrical center wall section and the first and second quarter-spherical end wall sections being configured to terminate at the flat surface to form a periphery corresponding to the shaped periphery of the reed. The shaped periphery of the reed may be formed to be a race track shape.

The squeaker assembly may include an arm configured to extend from a first end to a second end, and having a first side and a second side. The second end of the arm may have a catch formed thereon, where the catch may simply be configured as a first flange that may extend laterally away from the second end of the arm, and a second flange that may extend a selective distance laterally away from the first flange. The second flange may thus be formed to engage a tab formed on the elongated second side of the curved wall.

A thin flexible strip of material may be integrally formed with the arm and the curved wall, to form a living hinge to pivotally couple the first end of the arm to the elongated first side of the curved wall, for the arm to extend substantially perpendicular to the axial direction. The arm may be substantially centered upon the first side of the curved wall. The arm may thus be configured to pivot from an un-engaged first position to a second position where the arm contacts the reed, and the second flange of the catch may snap over and engage the tab, for the arm to releasably engage the reed.

To provide for better acoustical performance by the reed and resonator cup, the elongated curved wall may include a first stiffener and a second stiffener, each of which may protrude from a substantially central position on the flat surface of each of the first side and the second side of the curved wall, respectively, with each of the first and second stiffeners oriented to be in line, and substantially perpendicular to the axial direction of the curved wall of the resonator cup. Also, the first side of the arm may broadly include a first stiffener and a second stiffener, each of which may be oriented to be substantially perpendicular to the axial direction, and may be configured to protrude from symmetrically opposite sides of a central position on the first side of the arm, to be symmetrically positioned with respect to the in-line first and second stiffeners on the curved wall.

Each the first and second stiffeners of the curved wall and the first and second stiffeners of the arm may be formed with a semi-cylindrical cross-sectional shape, for an apex thereof to contact and engage the reed. For consistent contact between the stiffeners and the reed, each of the first and second semi-cylindrical stiffeners of the curved wall may protrude to a same height above the flat surface along a length of the stiffeners. Also, each of the first and second semi-cylindrical stiffeners of the arm may also preferably protrude to a same distance away from a flat surface of the arm, along a full length of the stiffeners.

Lastly, for the straight apex of the stiffeners to properly engage the reed, a length of the thin flexible strip forming the living hinge, and a length of the first flange of the clasp are each formed for the apex of each of the stiffeners to engage the reed substantially uniformly across the length of the stiffeners.

A toy assembly may be formed to use the above described squeaker device within a specially designed conical plug. The toy assembly may broadly include a molded hollow shape, with an opening therein configured to form a selectively shaped periphery at the opening, and a conical plug having a first end and a second end. The second end of the plug may have a shaped annular groove, which may be configured to secure and seal the plug with respect to the shaped periphery of the opening, when the plug is inserted therein. The shaped annular groove at the second end of the plug may be formed with a shoulder surface, an annular central surface, and an angled inner surface, to match the correspondingly shaped opening in the molded hollow shape.

The conical plug may be formed with an axial through-opening that may include a first interior conduit beginning at the first end of the plug and being of sufficient length to interconnect with a second conduit formed at a substantially central position within the plug, and a third conduit beginning at the second end of the plug and formed of sufficient length to interconnect with the second conduit.

Each of the first, second, and third conduits may be substantially cylindrical, and may also be coaxially aligned. The second conduit may be formed with a greater lateral (diametrical) extent than a lateral extent of each of the first and third conduits. The squeaker may be centrally positioned within the second conduit and may have each of its two ends respectively extend part-way into each of the first and third conduits of the plug, to be loosely retained therein. The arrangement may permit bi-directional actuation of the squeaker device when the molded hollow shape is manually deformed into a compressed state and thereafter released to rebound into an uncompressed state.

For the squeaker device to be loosely retained in the conduits, the first and third conduits may be formed to have a radius to provide a clearance fit for the outer surface of the squeaker device, which may be a semi-circular shape. Also, the squeaker device may be formed to include a centrally positioned retaining ring, which may be annular, and the second conduit may be formed to have a radius to provide a clearance fit for a radius of the centrally positioned retaining ring. Also, the radius of the centrally positioned retaining ring may be larger than the radius of the first and third conduits, so that it may be received therein through elastic deformation of one of those conduit, to retain the squeaker device within the plug. In one embodiment, the radius of the first conduit may be larger than a radius of the third conduit, for the squeaker device to be received therein with a reduced amount of the elastic deformation.

BRIEF DESCRIPTION OF THE DRAWINGS

FIG. 1A is an exploded view of the component parts that have been used to create a prior art squeaker for a pet toy or a child's toy.

FIG. 1B shows the component parts of FIG. 1A assembled together to form the squeaker.

FIG. 2A shows the component parts of a prior art pet toy or child's toy, which includes the assembled prior art squeaker of FIG. 1B, a molded plug, and a molded toy ball.

FIG. 2B shows the component parts of FIG. 2A assembled together to form the pet toy or child's toy.

FIG. 3 is a front view of the resonating cup of the present invention, with a living hinge coupling an arm to the cup wall, and a catch incorporated therein.

FIG. 3A is a cross-sectional view through the resonating cup of FIG. 3.

FIG. 4 is a rear view of the resonating cup shown in FIG. 3.

FIG. 5 is an exploded view showing the resonating cup with living hinge, arm, and catch, as seen in FIG. 3, prior to receiving the reed therein.

FIG. 6 shows the reed after being received by and secured to the resonating cup, using the living hinge and arm with the catch thereon shown in FIG. 5, to form the squeaker assembly of the present invention.

DETAILED DESCRIPTION OF THE INVENTION

Figure 6A:
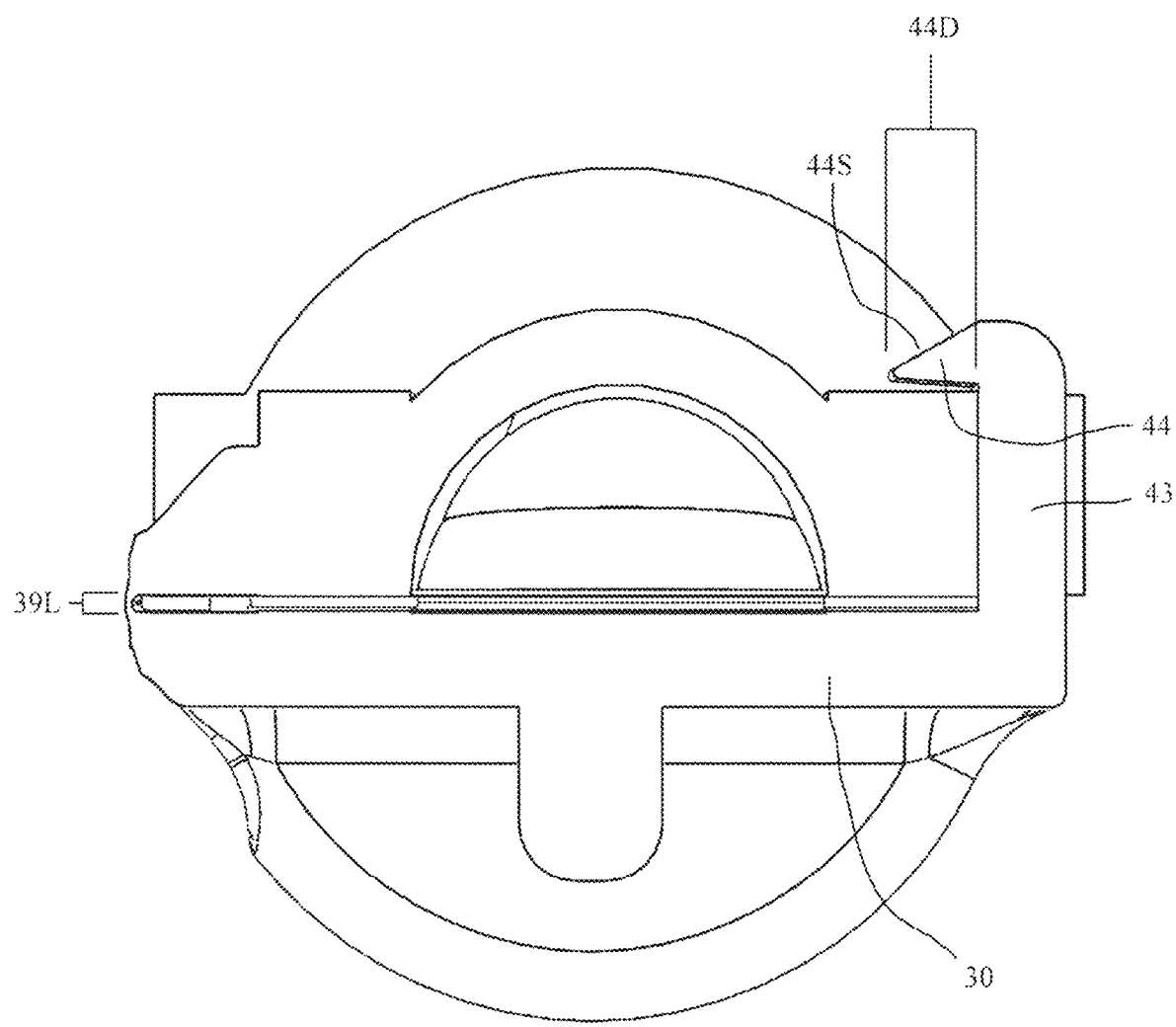
FIG. 6A is a cross-sectional view through the reed and resonating cup of FIG. 6.

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, all references (e.g., patents, published patent applications, and non-patent literature) that are cited within this documents are incorporated herein in their entirety by reference.

Furthermore, the described features, advantages, and characteristics of any particular embodiment disclosed in the following specification, may be combined in any suitable manner with any of the other embodiments disclosed herein.

FIG. 1A shows the prior art component parts that have been used to create a squeaker for a pet toy or a child's toy, while FIG. 1B shows those component parts from FIG. 1A assembled together to form the squeaker. FIG. 2A shows the prior art squeaker of FIG. 1A, a plug, and a molded toy prior to being assembled together, and FIG. 2B shows the squeaker and the plug after being installed through the opening in the molded toy.

As seen in FIG. 1A, the squeaker device for a child's toy or a pet toy traditionally includes four major components—a reed, an elongated cup that has an open side that is configured to receive the reed thereon, a retaining ring to secure the reed to the cup, and a housing, which is usually cylindrical. The assembled housing, with the reed, cup, and retaining ring received therein, may then inserted into an opening in an elastomeric toy. However, in most applications where the material of the toy is a natural rubber or TPE compound, the housing may instead be received within a thru-opening of a molded plug that is made of the same material, which may then be inserted into the hole in the hollow molded toy, to seal the opening into the hollow toy, except for the thru-opening in the plug.

Thus gripping and squeezing of the elastomeric portion of this conventional squeaker toy activates the squeaker device. The squeezing of the elastomeric molded body causes air to flow out from the cavity of the body and within the thru-opening in the plug, with the air flowing over one end of the reed and cup (the inward facing end), which causes vibrations that create the sound.

When the person (or the animal in the case of a pet toy) releases the grip on the toy, the elastomeric body normally begins returning to its undeformed shape, and in so doing, it draws air back through the thru-opening of the plug to till the cavity once again. The inward flowing air flows over the second end of the reed and cup (the outward facing end), which again causes vibrations that create sound.

Therefore, the retaining ring is configured to secure a center portion of the reed to a center portion of the cup, so that each end of the reed may be free to respectively respond to the flow of air directed onto the gap at the end, to produce the desired sound.

The prior art molded plug has typically included a large column of material that doubles as both the means for retaining the squeaker assembly in the toy, and as a protective device to add more durability to the squeaker device.

The present invention is particularly adapted to reduce the total number of parts necessary to achieve an effective squeak producing mechanism. In addition to being advantageous to more easily manufacture the device, the reduction in the total number of parts may also serve to minimize the parts that may become dislodged under extremely aggressive play when used as a pet toy, thus reducing the actual and/or the perceived danger, if the parts are exposed. The reduced parts count may also reduce the total amount of non-elastomeric material included in the product, thereby reducing the overall risk to an animal.

The present invention is a squeaker design that is reduced to only two major components, and eliminates both the molded plastic retaining ring and the plastic squeaker housing, and yet it may achieve an identical sound to the traditional design.

FIG. 3 shows a front view of the resonator cup 20 of the present invention, and FIG. 5 shows an exploded view of the resonator cup 20, and the reed 50. Cup 20 may have an elongated body 23 formed of a curved wall that may extend along an axial direction 20X from a first end 21 to a second end 22. As seen in FIG. 3A, the curved wall of cup 20 may have an outer surface 24 and an inner surface 25, which may be an offset of the outer surface, to provide for a wall thickness T. Both the inner surface 24 and the outer surface 25 may have a semicircular cross-sectional shape at its central portion, bounded by an elongated side/edge 27 and an elongated side/edge 28, which semicircular cross-sectional shape may transition to quarter-spherical surfaces at the ends 21 and 22. The curved wall may terminate on a generally flat surface 26, and may form a race-track shaped periphery where the ends of each of the outer surface 24 and the inner surface 25 terminate on flat surface 26. The resonator cup 20 may thus resemble half of a pressure vessel, which is typically formed of a cylindrical center section with ends that are each hemispherical. (Note that in an alternate embodiment for the squeaker 60' shown in FIGS. 7A, 7B, and 7C, the flat surface 26 of the curved wall may transition to respective angled surfaces that may angle towards the distal ends of the cup).

An arm 30 may be hingedly connected to a portion of the cup 20. The arm 30 may extend away from the first elongated side/edge 27 of a central portion of the cup 20, and a first end 31 of the arm may be coupled thereto using a living hinge 39, where, a flexible web of the same material, which may be thinned or cut, may integrally connect the arm to the wall of the cup, to permit the arm to flexibly pivot with respect to the cup. In the present invention, the thinned flexible web of material may be roughly between 0.005 to 0.030 inches thick, and may more preferably be between 0.010 and 0.020 inches thick. The material used for the resonator cup 20 may be any suitable material, including, but not limited to, polyethylene or polypropylene.

The outward facing side of the arm 30 may have one or more stiffeners protruding therefrom which may extend the length of the arm (away from the hinge axis 39), to provide sufficient stiffness, so that the arm will not deform significantly when securing the reed to the cup, so that it may be able to apply a consistent securing force across the reed 50. In one embodiment, the outward facing side of the arm 30 may have two stiffeners, one near each of the two unsupported sides of the arm, each of which may extend away from the hinge 39 (e.g., curved stiffeners 33A and 33B).

The inward facing side of the arm 30 may have one or more substantially straight stiffeners protruding therefrom. In one embodiment, the inward facing side of the arm 30 may have two stiffeners (e.g., protrusions 34A and 34B), each of which may generally be semi-cylindrical, and the apex of each rounded contact surface for each protrusion may be at substantially the same distance away from the generally flat surface of the arm. The distal rounded surface of the semi-cylindrical shape of stiffeners 34A and 34B may contact and engage the reed (see FIG. 7C).

The generally flat surface 26 of the curved wall may also have a substantially straight stiffener protruding from each side, at a central region of the cup, which may, as seen in FIG. 3, be protrusions 29A and 29B, each of which may also be semi-cylindrical. Protrusions 29A and 29B may preferably be in line with each other, and the apex of the rounded contact surface for each may be at substantially the same distance away from the generally flat surface 26, along a full length of the stiffeners. The substantially straight protrusions 34A and 34B protruding from the inward facing side of the arm 30 and the substantially straight in-line stiffeners 29A and 29B protruding from each side of the generally flat surface 36 of the curved wall of the cup may be particularly positioned in proximity to each other, as discussed below. A cross-wise stiffener 33C may span between the stiffeners 29A and 29B to provide support for a central portion of each of the protrusions 34A and 34B, so that they may be able to apply a substantially evenly distributed securing force across the front face of the reed, from one side of the reed to the other side.

A second end 32 of the arm 30 may be formed to include a catch 40, while the second side 28 of the central portion of the cup 20 may be formed to include a tab 45.

Figure 7A:
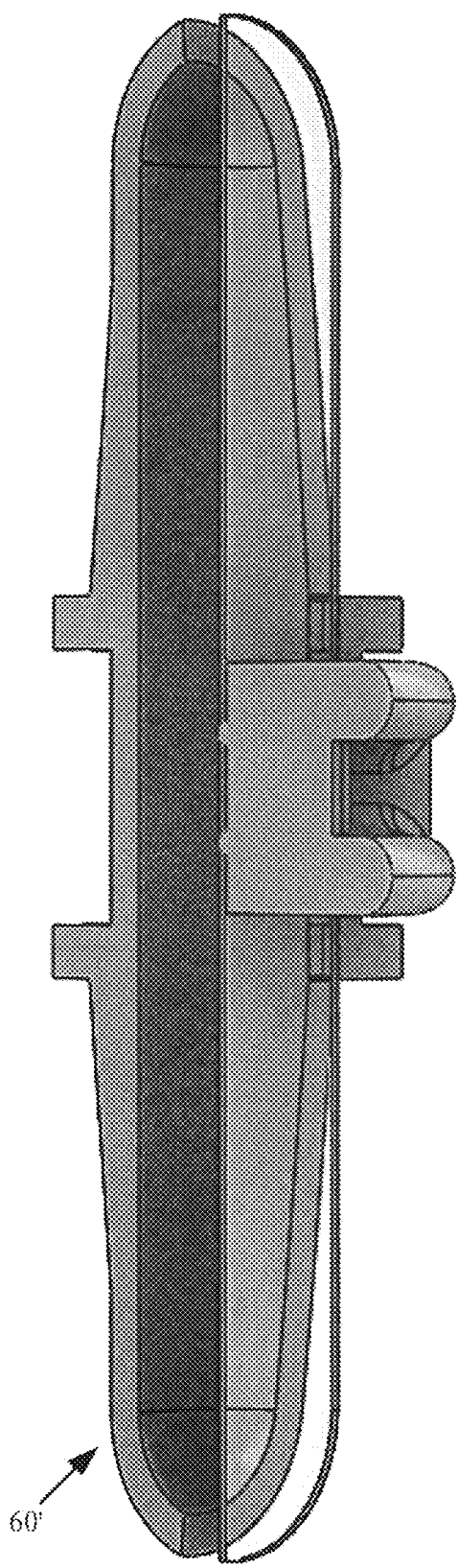
FIG. 7A is a cross-sectional perspective view through a mid-plane parallel to an axial direction of an alternate embodiment of the resonator cup, and showing the reed when secured thereto.
Figure 7B:
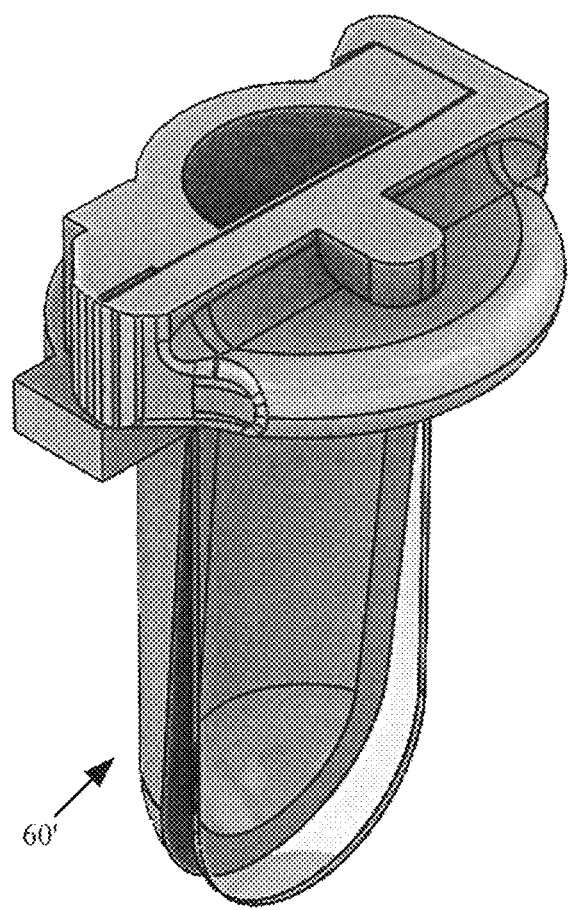
FIG. 7B is a cross-sectional perspective view through a mid-plane perpendicular to the axial direction of the alternate embodiment of the resonator cup of FIG. 7A, and showing the reed when secured thereto.

As seen in FIGS. 4, 6A, and 7B, the catch 40 may be formed by a first flange 43 extending laterally away from the arm 30 at its second end 32, and by a second flange 44 extending a selective distance 44D laterally away from the first flange 43. The outer surface of the second flange 45 may have a sloped surface 44S that may cause it to deflect laterally away from retaining tab 45 during rotation of the arm 30 to secure the reed between the protrusions. The reed 50 may be positioned over the correspondingly shaped opening 20P in the cup 20, with the periphery of the reed positioned to overlay the generally flat surface 26 of the wall of the cup. With the cup 20 oriented horizontally during assembly, the central portion of the bottom surface of the reed 50 would contact the rounded contact surfaces of the in-line protrusion 29A and 29B that protrude up from each side of the generally flat surface 36 of the wall of the cup, which may keep the reed from lying flush against the flat surface 36.

As the arm 30 is rotated using the living hinge 39, which may have a final length 39L (FIG. 6A) configured for the arm to be precisely positioned on the opposite side of the reed 50 as the curved wall, the rounded contact surfaces of protrusions 34A and 34B of the arm may be properly positioned to squarely come into engagement across the entire width of the exposed surface of the reed, while the opposite surface of the reed is similarly engaged by the in-line protrusion 29A and 29B, just as the flange 44 of the catch 40 becomes engaged with the retaining tab 45 that protrudes from the cup. A slight amount of over-rotation may be needed for the flange 44 to snap over and engage the retaining tab 45, which may temporarily cause minor/additional elastic deformation of the reed 50.

The arm 43 of the catch 40 may have a length configured so that when the arm 44 is engaged with the tab 45, the reed 50 may be engaged by and supported between the in-line protrusions 29A and 29B of the wall of the cup, and the protrusions 34A and 34B of the arm 30. To ensure a proper amount of engagement therebetween, the height of the protrusions 29A and 29B on the flat surface 36 of the cup, the height of the protrusions 34A and 34B on the arm 30, and the length of the arm 43 of the catch 40 will need to be coordinated with respect to the thickness of the central portion of the reed 50. It should be noted that those parameters may furthermore be configured so that the engagement of the two protrusions 34A and 34B on the arm 30, which preferably may be symmetrically positioned about the centerline 29C of the in-line protrusions 29A and 29B (see FIG. 3), may cause deformation of the reed 50 to set a desired distance between the ends of the reed and each of the first and second ends 21 and 22 of the cup.

Figure 7C:
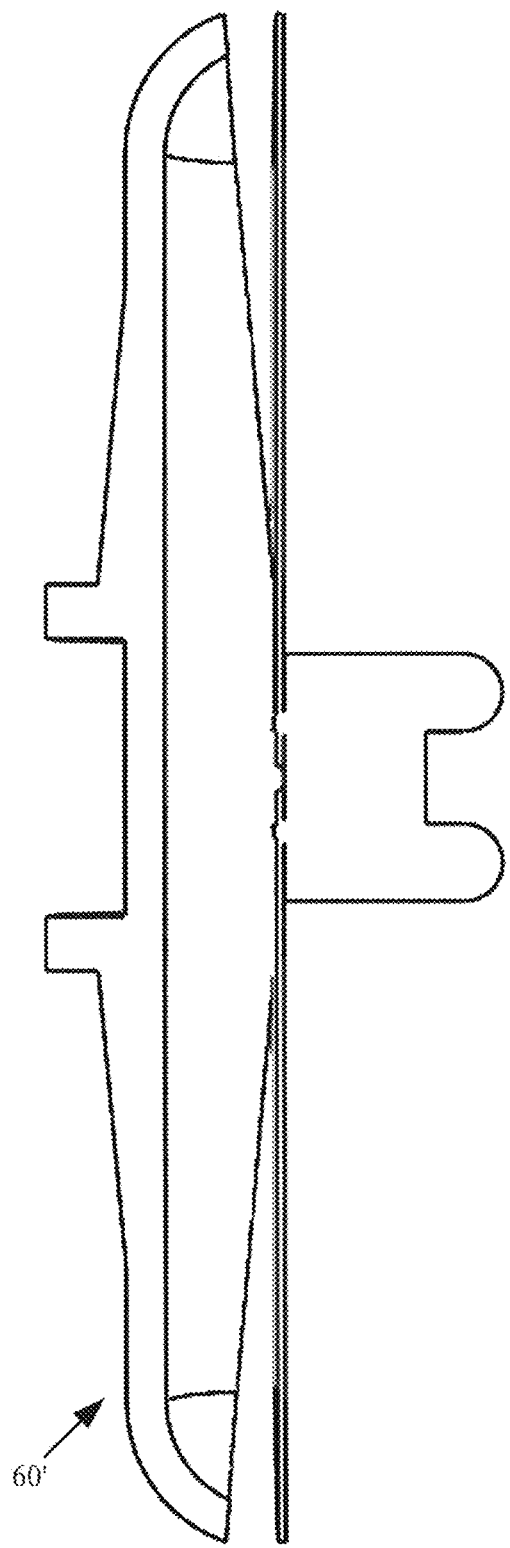
FIG. 7C is a cross-sectional view through the mid-plane parallel to the axial direction of the alternate embodiment of the resonator cup of FIG. 7A, and showing the reed when secured thereto.

The squeaker assembly 60 formed by the reed 50 secured to the body 23 of the cup 20, using the arm 30, the living hinge 39, and the catch 40, is shown in FIG. 6. The alternate embodiment is shown in FIGS. 7A-7C.

Figure 8:
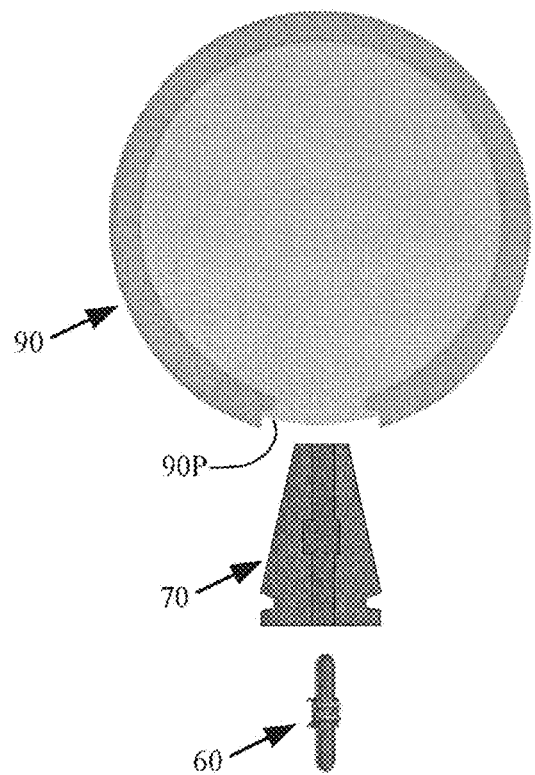
FIG. 8 is an exploded view showing the assembly sequence for the squeaker of FIG. 6, with a corresponding molded plug of the present invention, and a molded hollow toy with an opening therein.
Figure 8A:
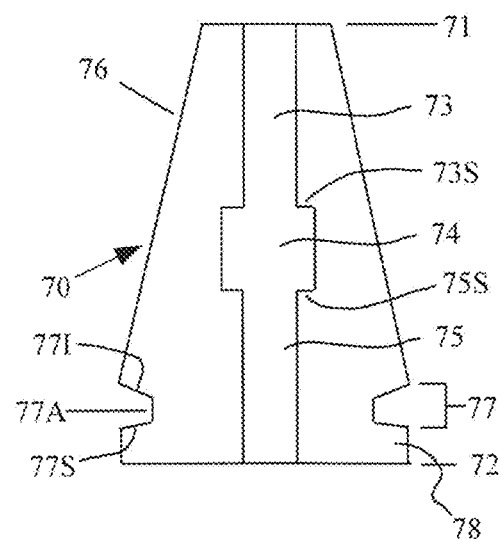
FIG. 8A is an enlarged detail view of the plug shown in FIG. 8.
Figure 9:
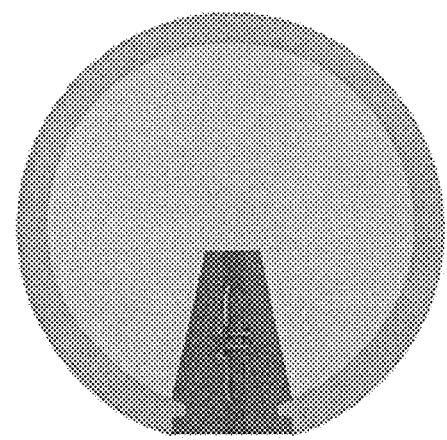
FIG. 9 shows the squeaker, the molded plug, and the hollow molded toy of FIG. 8 after being assembled together.

The plug 70 of the present invention, as seen in FIG. 8 and FIG. 8A, may have a substantially conical shape, with a first end 71 having a first diameter and a second end 72 with a second larger diameter. The plug 70 may have an axial through opening that may include a particular interior profile configured to selectively receive the squeaker assembly 60 therein. The interior profile of the plug 70 may be formed by a first conduit 73 that may begin at the first end 71 of the plug, and may extend into the interior of the plug to interconnect with a second conduit 74, which may be greater in its lateral extent than conduit 73. A third conduit 75 may begin at the second end of the plug 70 and may similarly interconnect with the second conduit 74, to provide for fluid communication through the interior of the plug, from one end to the other end, using the first, second, and third conduits, 73, 74, and 75.

The third conduit 75 may be substantially cylindrical in shape, and may be formed to have a radius that is roughly the same radius as the semi-circular shape of the outer surface 24 of the body 23 of the cup 20, or it may instead be slight larger or slightly smaller than the body 23.

The squeaker assembly 60 may be received into the plug 70 through the conduit 75, with some elastic deformation of the plug material being necessary to permit passing therethrough of the protruding stop members 23S on each side of the body 23 of the resonator cup 20. The squeaker assembly 60 may be inserted into the plug 70 until the stop members 23S on the body 23 are received within the larger second conduit 74, at which time the plug material in the conduit 75 may return to its undeformed condition. Inadvertent removal or dislodging of the squeaker assembly 60 from its position within the plug may be prevented by the stop members 23S on the body 23 of the cup 20 contacting either of the shoulders 73S or 75S formed respectively from the size difference between the first and second conduits 73 and 74, and from the size difference between the second and third conduits 74 and 75. Therefore, in one embodiment, the conduits 73 and 75 may be symmetrical with respect to conduit 74. The stop members 23S on the body 23 of the cup

20 may be separate members, or they may be interconnected using a partial ring shape, as seen in FIG. 4, which may also be of a sufficient size to contact the shoulders 73S or 74S, and may also serve to help retain the squeaker assembly 60 within the plug 70.

The exterior surface of the plug 70 may be formed to generally have a conical shape 76, with a narrow end of the cone shape beginning at the first end 71 of the plug, and extending most of the way towards its second end 72. Proximate to its second end 72, the plug 70 may have a shaped groove 77 that may form a head 78. The shaped groove 77 may have a shoulder surface 77S, an annular central surface 77A, and an angled inner surface 77I.

The plug 70 may thus be configured to be received into the molded hollow toy 90 shown in FIG. 8, through an opening 90P therein. The opening 90P in the molded hollow toy 90 may be correspondingly shaped to match the groove 77 and head 78 of the plug 70, so that the plug may be received and held therein, with the second end 72 being positioned substantially coextensive with the periphery of the opening 90P at the outer surface of the toy 90. The conically shaped exterior surface 76 of the plug 70 may help facilitate its insertion through the opening 90P of the molded hollow toy 90.

The second end 72 of the plug may be generally flat, as shown in FIG. 8 and FIG. 8A, or it may instead be shaped to match the contour of the molded hollow toy 90 at the opening 90P. Therefore, if the toy is spherical in shape so that it may roll like a ball, the surface at the second end 72 of the plug 70 may be part-spherical.

Figure 8B:
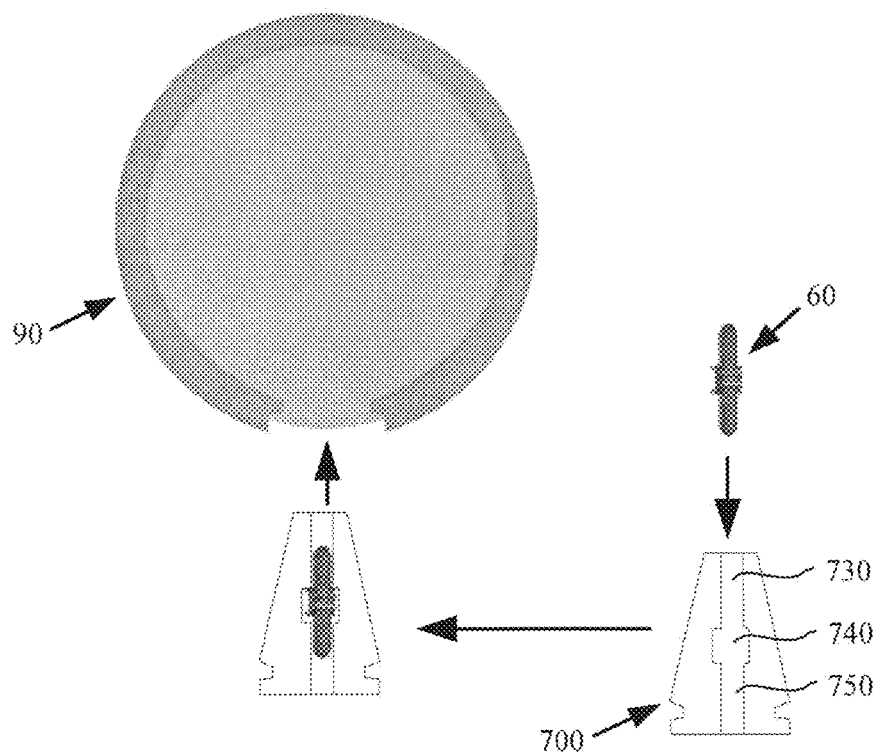
FIG. 8B shows an alternate assembly sequence, showing assembly of the squeaker of FIG. 6 through a larger inner opening of an alternate embodiment of the molded plug, and then insertion of the squeaker/plug combination into a molded hollow toy with an opening therein.

In an alternate embodiment, shown in FIG. 8B, the conduits may not be formed to be symmetrical, and instead the first conduit 730 of the plug 700 may be slightly larger than the third conduit 750, which may be only large enough to properly allow the end of the cup and the reed to be received therein in a slight clearance fit, which may permit flutter and noising making by the reed at that end. The slightly larger first conduit 730 may be deformed when used for insertion of the squeaker 60 into its captive position.

In another embodiment of the present invention, the reed and the resonator cup that form the squeaker may be manufactured of a non-petrochemical material, and may instead be formed of a material permitting it to be biodegradable and/or compostable.

The examples and descriptions provided merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

What is claimed is:

1. A squeaker assembly for a pet toy, configured to reduce a total number of parts to minimize parts that may become dislodged by aggressive play by the pet, said squeaker assembly comprising:
    a reed having a shaped periphery with a first end and a second end; and
    a resonator cup configured to support said reed, said resonator cup comprising:
        an elongated curved wall configured to extend along an axial direction from a first end to a second end, and having an elongated first side and an elongated second side; at least a portion of said elongated curved wall configured to terminate on a flat surface; said resonator cup comprising first and second substantially straight semi-cylindrical stiffeners oriented to protrude from said flat surface substantially perpendicular to the axial direction and on respective sides of a central region of said resonator cup, and being in-line, each said first and second semi-cylindrical stiffeners having an apex formed at substantially a same distance away from said flat surface; said elongated second side comprising a tab;
    an arm configured to extend from a first end to a second end, and having a first side and a second side; said second end of said arm comprising a catch, said catch comprising a first flange configured to extend laterally away from said second end of said arm, and a second flange configured to extend a selective distance laterally away from said first flange; said arm comprising first and second substantially straight semi-cylindrical protrusions oriented to protrude from said second side of said arm substantially perpendicular to the axial direction, each said first and second semi-cylindrical protrusions being spaced substantially a same distance away from an axis of said in-line first and second substantially straight semi-cylindrical stiffeners, and each said first and second semi-cylindrical protrusions comprising an apex formed at substantially a same distance away from said second side;
    a thin flexible strip integrally formed with said arm and said curved wall, to form a living hinge to pivotally couple said first end of said arm to said elongated first side of said curved wall, for said arm to extend substantially perpendicular to said axial direction, and to pivot from a first position to a second position, where said arm contacts said reed, and for said second flange of said catch to snap over and engage said tab for said arm to releasably engage said reed; and
    wherein said first and second substantially straight semi-cylindrical stiffeners and said first and second substantially straight semi-cylindrical protrusions are configured to apply a substantially evenly distributed securing force across a front face of said reed, from a first side of said reed to a second side of said reed to selectively engage said reed when said second flange of said catch engages said tab, to respectively space said first and second ends of said reed a distance away from said first and second ends of said resonator cup.

2. The squeaker assembly according to claim 1, wherein said arm is substantially centered upon said first side of said curved wall; and wherein said elongated curved wall is configured to terminate on said flat surface to form a periphery corresponding to said shaped periphery of said reed.

3. The squeaker assembly according to claim 2, wherein said elongated curved wall of said resonator cup comprises an inner surface and an offset outer surface formed by a semi-cylindrical center wall section configured to transition to first and second quarter spherical end wall sections, with each of said semi-cylindrical center wall section and said first and second quarter-spherical end wall sections configured to terminate at said flat surface.

4. The squeaker assembly according to claim 3, wherein said elongated curved wall further comprises:
    a first stiffener and a second stiffener protruding from a substantially central position of said flat surface from each of said first side and said second side of said curved wall, respectively, with each of said first and second stiffeners oriented to be in line, and substantially perpendicular to said axial direction;

wherein said first side of said arm comprises a first stiffener and a second stiffener each oriented to be substantially perpendicular to said axial direction, and configured to protrude from symmetrically opposite sides of a central position on said first side of said arm, to be symmetrically positioned with respect to said in-line first and second stiffeners of said curved wall.

5. The squeaker assembly according to claim 4 wherein said first and second stiffeners of said curved wall and said first and second stiffeners of said arm each comprise a semi-cylindrical cross-sectional shape, each configured for an apex thereof to contact and engage said reed.

6. The squeaker assembly according to claim 5 wherein each of said first and second semi-cylindrical stiffeners of said curved wall protrude to a same height along a length of said stiffeners.

7. The squeaker assembly according to claim 6 wherein each of said first and second semi-cylindrical stiffeners of said arm protrude to a same distance away from said flat surface along a full length of said stiffeners.

8. The squeaker assembly according to claim 7 wherein a length of said thin flexible strip forming said living hinge, and a length of said first flange of said clasp are each configured for said apex of each said stiffener to engage said reed substantially uniformly across said length of said stiffeners.

9. The squeaker assembly according to claim 8 wherein said shaped periphery of said reed comprises a race track shape.

10. A pet toy configured to reduce a total number of parts and minimize parts that may become dislodged by aggressive play by the pet, said pet toy comprising:
a molded hollow shape, with an opening therein configured to form a selectively shaped periphery at said opening;
a conical plug having a first end and a second end, and comprising:
an axial through-opening comprising a first conduit, a second conduit, and a third conduit, said axial through-opening formed by said first conduit beginning at said first end and configured to interconnect with said second conduit at a substantially central position within said plug, and said third conduit beginning at said second end of said plug and configured to interconnect with said second conduit; wherein said second conduit comprises a greater lateral extent than a lateral extent of each of said first and third conduits; and
a shaped annular groove at said second end of said plug;
a bi-directional squeaker device configured to be received within said second conduit and to extend part-way into each of said first and third conduits of said plug, and have corresponding portions be retained in said first, second, and third conduits in a respective clearance fit, to result in bi-directional actuation of said squeaker device when said molded hollow shape is manually deformed into a compressed state and thereafter released to rebound into an uncompressed state;
wherein said bi-directional squeaker device comprises:
a reed having a first end and a second end, with each of said first and second ends of said reed configured to produce sound; and
a resonator cup comprising:
an elongated curved wall configured to terminate on a flat surface; said elongated curved wall comprising a tab;
means for spacing each of said first end and said second end of said reed a distance away from said first end and said second end of said resonator cup, respectively;
an arm configured to extend from a first end to a second end; said second end of said arm comprising a catch;
a thin flexible strip integrally formed with said arm and said curved wall, to form a living hinge to pivotally couple said first end of said arm to said curved wall, for said arm to extend substantially perpendicular to said axial direction, and to pivot from a first position to a second position, where said arm contacts said reed and said catch releasably engages said tab for said arm to releasably engage a central portion of said reed; and
wherein said thin flexible strip and said arm are each centrally positioned between said first end of said elongated curved wall and said second end of said elongated curved wall; and
wherein a lateral extent of said arm is greater than a lateral extent of said first and third conduits, to nest said arm of said bi-directional squeaker device between said first and third conduits within said second conduit of said conical plug in said clearance fit; and
wherein said shaped annular groove at said second end of said plug is configured to secure and seal said plug with respect to said shaped periphery of said opening in said molded hollow shape, when said plug is inserted within said opening therein.

11. The pet toy according to claim 10
wherein each of said first, said second, and said third conduits are substantially cylindrical and coaxial aligned;
wherein an outer surface at each of a first end and a second end of said squeaker device comprises a semi-circular-shaped outer surface; and
wherein a radius of said cylindrical first conduit and a radius of said cylindrical third conduit are each formed to provide said clearance fit for said semi-circular-shaped outer surfaces at said first and second ends of said squeaker device.

12. The pet toy according to claim 11 wherein said radius of said first conduit is larger than said radius of said third conduit, for said squeaker device to be received therein with a reduced amount of said elastic deformation.

13. The pet toy according to claim 12 wherein said shaped annular groove at said second end of said plug comprises a shoulder surface, an annular central surface, and an angled inner surface.

* * * * *